(12) United States Patent
McKenzie et al.

(10) Patent No.: US 8,411,849 B1
(45) Date of Patent: Apr. 2, 2013

(54) PERSONAL ELECTRONIC DEVICE STORAGE APPARATUS AND ASSOCIATED METHOD

(76) Inventors: Ellen McKenzie, Rosedale, NY (US); Astley Shields, Seagirt Beach, NY (US)

( * ) Notice: Subject to any disclaimer, the term of this patent is extended or adjusted under 35 U.S.C. 154(b) by 155 days.

(21) Appl. No.: 13/099,242

(22) Filed: May 2, 2011

Related U.S. Application Data

(60) Provisional application No. 61/329,627, filed on Apr. 30, 2010.

(51) Int. Cl.
*H04M 1/00* (2006.01)
*H04M 9/00* (2006.01)

(52) U.S. Cl. ......... 379/446; 379/437; 379/440; 379/451

(58) Field of Classification Search .................. 379/437, 379/440, 441, 44, 451; 455/575.1, 556.1; 224/161, 666, 678, 679, 681, 930
See application file for complete search history.

(56) References Cited

U.S. PATENT DOCUMENTS

| | | | |
|---|---|---|---|
| 5,938,137 | A | 8/1999 | Poulson |
| 6,546,103 | B1 | 4/2003 | Wong |
| 6,883,694 | B2 | 4/2005 | Abelow |
| 2003/0165237 | A1* | 9/2003 | Farr et al. ...................... 379/430 |
| 2004/0204165 | A1* | 10/2004 | Huang ........................ 455/569.1 |
| 2006/0032877 | A1* | 2/2006 | Obolo ........................... 224/269 |
| 2007/0215663 | A1* | 9/2007 | Chongson et al. ............ 224/930 |

* cited by examiner

*Primary Examiner* — Tuan D Nguyen

(57) ABSTRACT

A personal electronic device storage apparatus includes a portable storage case including a body having a divider wall statically seated therein. A first cavity is disposed above the divider wall for containing the personal electronic device therein. A second cavity is disposed below the divider wall. A lead plate seated within the first cavity for preventing electromagnetic waves from passing through the body. First and second retractable cords are rotatably disposed within the second cavity, and first and second holders attached to distal ends of the first and second retractable cords respectively. At least one of the first and second holders may be capable of may be tethered to the personal electronic device. Such a structural configuration provides the unexpected and unpredictable advantage of shielding the personal electronic device from electromagnetic waves while keeping it tethered to the storage case.

15 Claims, 4 Drawing Sheets

PERSONAL ELECTRONIC DEVICE STORAGE APPARATUS AND ASSOCIATED METHOD

CROSS REFERENCE TO RELATED APPLICATIONS

This application claims the benefit of U.S. Provisional Application No. 61/329,627, filed Apr. 30, 2010, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to holders for personal electronic devices (PEDs) and, more particularly, to a personal electronic devices storage apparatus for providing users with an easy and convenient means of ready access to their PEDs at all times while also preventing the device from being accidentally dropped when stored or during use.

2. Prior Art

Today's personal electronic devices include IPods, cell phones, MP3 players and digital cameras for example. New designs and combinations of $3^{rd}$ and even $4^{th}$ generation devices are being constantly developed and offered for sale to the general public, for office and even for military use. Today, people are using these PEDs for multitasking activities, for example getting stock quotes, e-mailing friends and business associates, transmitting computer files, paging, checking traffic and weather reports, "surfing" the Internet, listening to music, watching a movie, and making phone calls while on-the-go. Compact in size, most of these PEDs can fit in a briefcase, purse or pocket with ease. The popularity of these hand held devices has enjoyed phenomenal growth in recent years. In fact, it is estimated that in the United States alone, over 140 million people have "gone wireless." The benefits of owning one of these devices have never been disputed. Providing stranded motorists with a means of calling for help, offering frequent travelers a means of staying in contact with loved ones, listening to music or watching a movie and even closing deals while on the road, these PEDs are an indispensable tool that millions would never be without.

Although there is little doubt that these PEDs are extremely useful devices, they do little good if they are lost. In addition, the problem of dropping and breaking one's PED during use is an extreme challenge to many users. Specifically, many consumers store their PEDs on belt loops, in pants or shirt pockets, or in the pouches of back packs, briefcases and purses, which can be somewhat unsafe. The simple act of bending over to tie a shoe or pick up a dropped object can result in the device falling from a pocket, pouch or belt loop and crashing to the ground. As these PEDs generally range in price from anywhere between fifty dollars to upwards of several hundred dollars for certain models, dropping such a device can be a costly mistake.

Accordingly, a need remains for an apparatus in order to overcome the above-noted shortcomings. The present invention satisfies such a need by providing a personal electronic devices storage apparatus that is convenient and easy to use, lightweight yet durable in design, versatile in its applications, and designed for easily and conveniently accessing users PEDs at all times while also preventing the devices from being accidentally dropped when stored or during use.

BRIEF SUMMARY OF THE INVENTION

In view of the foregoing background, it is therefore an object of the present invention to provide a personal electronic device storage apparatus for assisting a user to keep the personal electronic device at a safe location during extended time periods. These and other objects, features, and advantages of the invention are provided by a personal electronic device storage apparatus preferably includes a portable storage case including a body having a divider wall statically seated therein and extending along an entire longitudinal length of the body, a first cavity disposed above the divider wall. Such a first cavity may be capable of containing the personal electronic device therein.

The storage case further includes a second cavity disposed below the divider wall, a lead plate seated within the first cavity for preventing electromagnetic waves from passing through the body. Such a lead plate may be isolated from the second cavity. The storage case further includes first and second retractable cords rotatably disposed within the second cavity, and first and second holders attached to distal ends of the first and second retractable cords respectively. In this manner, at least one of the first and second holders may be capable of may be tethered to the personal electronic device. Such a structural configuration provides the unexpected and unpredictable advantage of shielding the personal electronic device from electromagnetic waves while keeping it tethered to the storage case.

In a non-limiting exemplary embodiment, the first retractable cord may pass through the first cavity prior to egressing the body.

In a non-limiting exemplary embodiment, the second retractable cord may remain isolated from the first cavity and egresses the body via the second cavity.

In a non-limiting exemplary embodiment, the first and second retractable cords rotate about mutually exclusive first and second rotational paths respectively defined within the second cavity.

In a non-limiting exemplary embodiment, the portable storage case may further include a belt clip integrally attached to an exterior of the body.

In a non-limiting exemplary embodiment, the portable storage case may further include a flap pivotally mated to an exterior of the body, and a locking mechanism attached to an exterior of the body as well as the flap for maintaining the flap at a closed position relative to the body.

In a non-limiting exemplary embodiment, each of the first and second holders may include a male section and a female section removably attached thereto respectively.

The present invention may further include a method of utilizing a personal electronic device storage apparatus for assisting a user to keep the personal electronic device at a safe location during extended time periods. Such a method preferably includes the chronological steps of: providing a portable storage case by performing the following steps: providing a body having a divider wall statically seated therein and extending along an entire longitudinal length of the body such that a first cavity may be disposed above the divider wall and a second cavity may be disposed below the divider wall; preventing electromagnetic waves from passing through the body by providing and seating a lead plate within the first cavity; isolating the lead plate from the second cavity; providing and rotatably disposing first and second retractable cords within the second cavity; providing and attaching first and second holders to distal ends of the first and second retractable cords respectively; tethering at least one of the first and second holders to the personal electronic device; and positioning the personal electronic device within the first cavity of the body while the personal electronic device remains tethered to the one first and second holder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
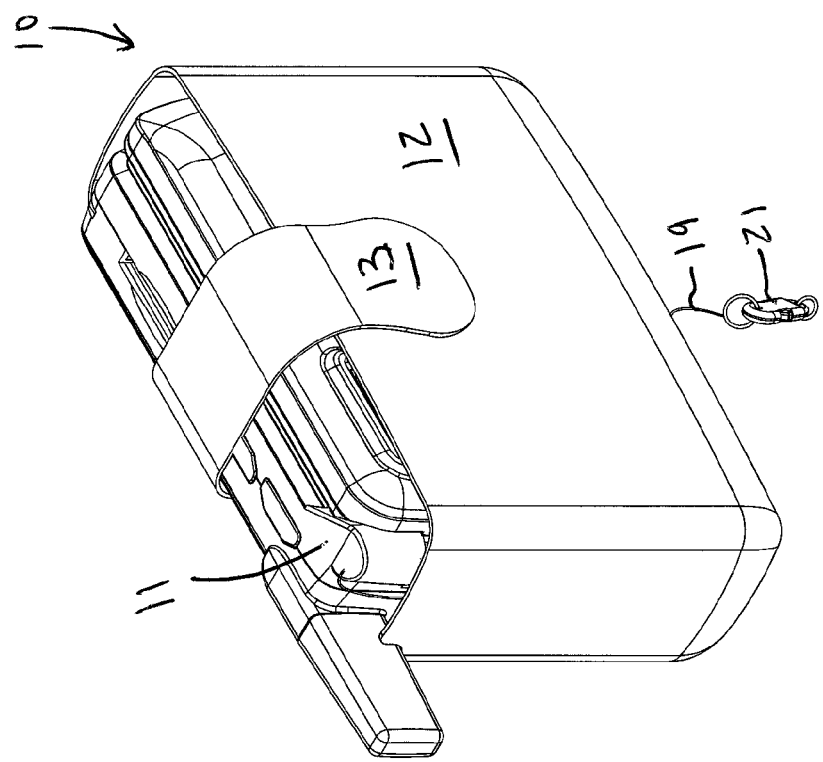
FIG. 1 is a perspective view showing a personal electronic device storage apparatus housing a cell phone therein, in accordance with the present invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "present invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The below disclosed subject matter is to be considered illustrative, and not restrictive, and the appended claims are intended to cover all such modifications, enhancements, and other embodiments which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

Figure 2:
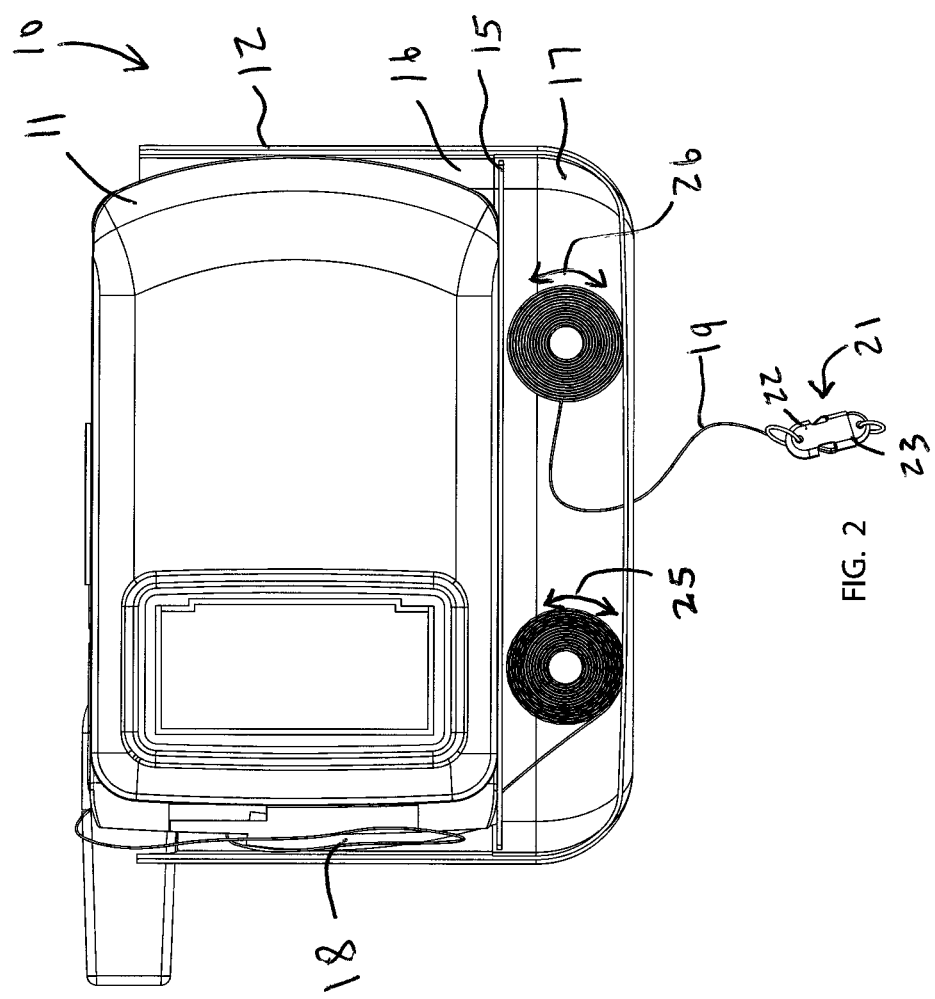
FIG. 2 is a cross-sectional view showing the structural configuration of the retractable cords housed in a lower portion of the apparatus.
Figure 3:
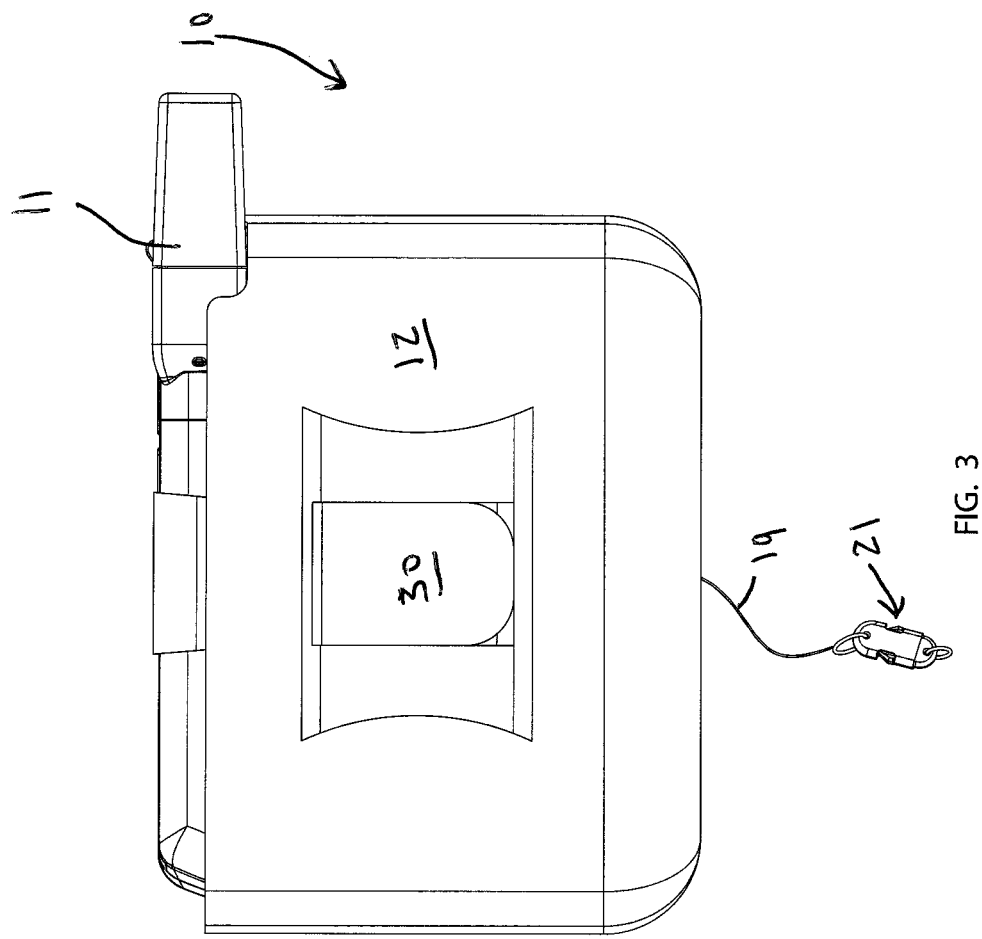
FIG. 3 is a rear elevational view showing a belt clip attached to the apparatus.
Figure 4:
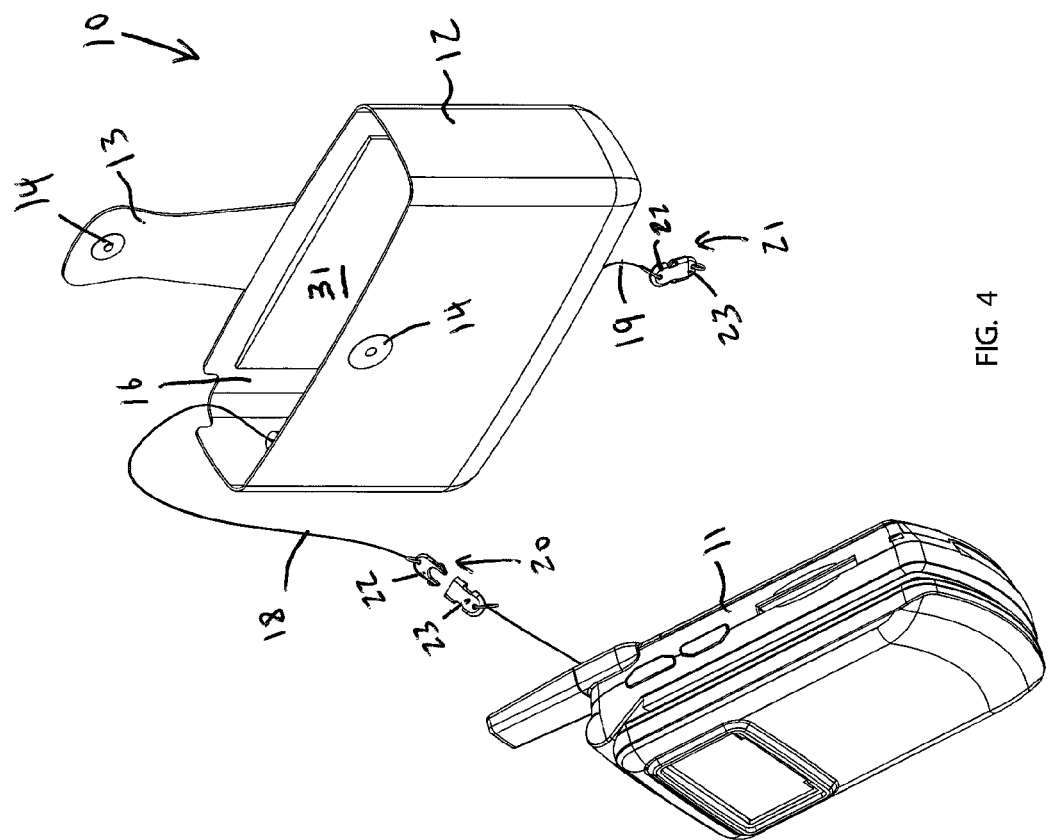
FIG. 4 is a perspective view showing the cell phone removed from the apparatus and tethered to one of the retractable cords.

The apparatus of this invention is referred to generally in FIGS. 1-4 and is intended to provide a personal electronic device storage apparatus for assisting a user to keep the personal electronic device 11 at a safe location during extended time periods. It should be understood that the present invention may be used to store many different types of personal electronic devices, and should not be limited to a cell phone described herein.

The personal electronic device storage apparatus preferably includes a portable storage case 10 including a body 12 having a divider wall 15 statically seated therein and extending along an entire longitudinal length of the body 12. A first cavity 16 may be disposed above the divider wall 15. Such a first cavity 16 may be capable of containing the personal electronic device 11 therein. The storage case 10 further includes a second cavity 17 disposed below the divider wall 15, and a lead plate seated within the first cavity 16 for preventing electromagnetic waves from passing through the body 12. Such a lead plate 31 may be isolated from the second cavity 17 so that it does not interfere with the winding/unwinding of first and second retractable cords 18, 19 rotatably disposed within the second cavity 17. First and second holders 20, 21 may be attached to distal ends of the first and second retractable cords 18, 19, respectively. In this manner, at least one of the first and second holders 20, 21 may be capable of being tethered to the personal electronic device 11. Such a structural configuration provides the unexpected and unpredictable advantage of shielding the personal electronic device 11 from electromagnetic waves while keeping it tethered to the storage case 10.

In a non-limiting exemplary embodiment, the first retractable cord 18 may pass through the first cavity 16 prior to egressing the body 12.

In a non-limiting exemplary embodiment, the second retractable cord 19 may remain isolated from the first cavity 16 and egresses the body 12 via the second cavity 17.

In a non-limiting exemplary embodiment, the first and second retractable cords 18, 19 rotate about mutually exclusive first and second rotational paths 25, 26 respectively defined within the second cavity 17.

In a non-limiting exemplary embodiment, the portable storage case 10 may further include a belt clip 30 integrally attached to an exterior of the body 12.

In a non-limiting exemplary embodiment, the portable storage case 10 may further include a flap 13 pivotally mated to an exterior of the body 12, and a locking mechanism 14 attached to an exterior of the body 12 as well as the flap 13 for maintaining the flap 13 at a closed position relative to the body 12.

In a non-limiting exemplary embodiment, each of the first and second holders 20, 21 may include a male section 22 and a female section 23 removably attached thereto respectively.

The present invention may further include a method of utilizing a personal electronic device storage apparatus for assisting a user to keep the personal electronic device 11 at a safe location during extended time periods. Such a method preferably includes the chronological steps of: providing a portable storage case 10 by performing the following steps: providing a body 12 having a divider wall 15 statically seated therein and extending along an entire longitudinal length of the body 12 such that a first cavity 16 may be disposed above the divider wall 15 and a second cavity 17 may be disposed below the divider wall 15; preventing electromagnetic waves from passing through the body 12 by providing and seating a lead plate 31 within the first cavity 16; isolating the lead plate 31 from the second cavity 17; providing and rotatably disposing first and second retractable cords 18, 19 within the second cavity 17; providing and attaching first and second holders 20, 21 to distal ends of the first and second retractable cords 18, 19 respectively; tethering at least one of the first and second holders 20, 21 to the personal electronic device 11; and positioning the personal electronic device 11 within the first cavity 16 of the body 12 while the personal electronic device 11 remains tethered to the one of the first and second holders 20, 21.

The storage case 10 may be manufactured from molded plastic or rubber, as well as soft casings such as canvas, nylon or even fancy leather material well known in the art. Reinforced, and in the case of soft casings, double stitched, the storage case 10 may further be designed as a fitted sleeve and produced in a variety of sizes and shapes to accommodate the various conventional personal electronic devices 11 (PEDs).

The durable belt clip 30 may be integrally attached to the exterior of the storage case body 12 and have an integrated locking mechanism 14 such as a push button release, thus ensuring a secure hold during use. The retractable cords 18, 19 may be made from a sturdy, yet flexible plastic coated plastic and may measure several inches in length. The retractable cords 18, 19 may be self retracting and coiled around a resilient spring in a manner well known in the industry. In this manner, the PEDs 11 may be securely tethered to the apparatus 10 at all times.

The personal electronic devices storage apparatus would provide users with many significant benefits and advantages. For example, the apparatus would provide users with ready access to their PED 11 whenever needed. Conveniently secured to the person, a purse or other designated object, the apparatus would spare the user the hassle of digging inside their purse, briefcase or backpack in order to locate their PED 11. In addition, the apparatus would prove a valuable safety tool, ensuring the PED 11 could never drop or fall to the ground. A sleek and attractive case 10 boasting integrated, retractable safety cords 18, 19 secured to the PED 11, use of the apparatus would effectively prevent those accidental mishaps which often occur when the PED 11 falls out of a pocket, holster or similar storage device. The apparatus may further prevent the PED 11 from exposure to dust, dirt and similar debris or electromagnetic waves.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention. In particular, with respect to the above description, it is to be realized that the optimum dimensional relationships for the parts of the present invention may include variations in size, materials, shape, form, function and manner of operation.

What is claimed as new and what is desired to secure by Letters Patent of the United States is:

1. A personal electronic device storage apparatus for assisting a user to keep the personal electronic device at a safe location during extended time periods, said personal electronic device storage apparatus comprising: a portable storage case comprising a body having a divider wall statically seated therein;
a first cavity disposed above said divider wall, said first cavity being capable of containing the personal electronic device therein;
a second cavity disposed below said divider wall;
a lead plate seated within said first cavity for preventing electromagnetic waves from passing through said body;
first and second retractable cords rotatably disposed within said second cavity; and
first and second holders attached to distal ends of said first and second retractable cords respectively;
wherein at least one of said first and second holders is capable of being tethered to the personal electronic device.

2. The personal electronic device storage apparatus of claim 1, wherein said first retractable cord passes through said first cavity prior to egressing said body.

3. The personal electronic device storage apparatus of claim 1, wherein said second retractable cord remains isolated from said first cavity and egresses said body via said second cavity.

4. The personal electronic device storage apparatus of claim 1, wherein said first and second retractable cords rotate about mutually exclusive first and second rotational paths respectively defined within said second cavity.

5. The personal electronic device storage apparatus of claim 1, wherein said portable storage case further comprises: a belt clip integrally attached to an exterior of said body.

6. The personal electronic device storage apparatus of claim 1, wherein said portable storage case further comprises:
   a flap pivotally mated to an exterior of said body; and
   a locking mechanism attached to an exterior of said body as well as said flap for maintaining said flap at a closed position relative to said body.

7. The personal electronic device storage apparatus of claim 1, wherein each of said first and second holders comprises: a male section and a female section removably attached thereto respectively.

8. A personal electronic device storage apparatus for assisting a user to keep the personal electronic device at a safe location during extended time periods, said personal electronic device storage apparatus comprising: a portable storage case comprising
   a body having a divider wall statically seated therein and extending along an entire longitudinal length of said body;
   a first cavity disposed above said divider wall, said first cavity being capable of containing the personal electronic device therein;
   a second cavity disposed below said divider wall;
   a lead plate seated within said first cavity for preventing electromagnetic waves from passing through said body, said led plate being isolated from said second cavity;
   first and second retractable cords rotatably disposed within said second cavity; and
   first and second holders attached to distal ends of said first and second retractable cords respectively;
   wherein at least one of said first and second holders is capable of being tethered to the personal electronic device.

9. The personal electronic device storage apparatus of claim 8, wherein said first retractable cord passes through said first cavity prior to egressing said body.

10. The personal electronic device storage apparatus of claim 8, wherein said second retractable cord remains isolated from said first cavity and egresses said body via said second cavity.

11. The personal electronic device storage apparatus of claim 8, wherein said first and second retractable cords rotate about mutually exclusive first and second rotational paths respectively defined within said second cavity.

12. The personal electronic device storage apparatus of claim 8, wherein said portable storage case further comprises: a belt clip integrally attached to an exterior of said body.

13. The personal electronic device storage apparatus of claim 8, wherein said portable storage case further comprises:
   a flap pivotally mated to an exterior of said body; and
   a locking mechanism attached to an exterior of said body as well as said flap for maintaining said flap at a closed position relative to said body.

14. The personal electronic device storage apparatus of claim 8, wherein each of said first and second holders comprises: a male section and a female section removably attached thereto respectively.

15. A method of utilizing a personal electronic device storage apparatus for assisting a user to keep the personal electronic device at a safe location during extended time periods, said method comprising the chronological steps of:
   providing a portable storage case by performing the following steps
   providing a body having a divider wall statically seated therein and extending along an entire longitudinal length of said body such that a first cavity is disposed above said divider wall and a second cavity is disposed below said divider wall;
   preventing electromagnetic waves from passing through said body by providing and seating a lead plate within said first cavity;
   isolating said lead plate from said second cavity;
   providing and rotatably disposing first and second retractable cords within said second cavity;
   providing and attaching first and second holders to distal ends of said first and second retractable cords respectively;
   tethering at least one of said first and second holders to the personal electronic device; and
   positioning the personal electronic device within said first cavity of said body while said personal electronic device remains tethered to one of said first and second holder.

* * * * *